3,497,568
CONTINUOUS PROCESS FOR POLYMERIZING OLEFINS
William D. Stepanek and George S. Saines, Fishkill, and John T. Nolan, Jr., Wappingers Falls, N.Y., assignors to Texaco Inc., New York, N.Y., a corporation of Delaware
No Drawing. Filed Sept. 29, 1967, Ser. No. 671,582
Int. Cl. C08f 1/72; C07c 3/18; B01j 9/02
U.S. Cl. 260—683.15        9 Claims

ABSTRACT OF THE DISCLOSURE

There is disclosed a continuous method for polymerizing olefins having from three to five carbon atoms by passing a liquefied mixture of an olefin feed stream upwardly through a vertical elongated reaction vessel partially loaded with silica gel in the lower portion of said reactor while introducing a catalyst solution of aluminum bromide and hydrogen bromide into said reactor at a point adjacent to the upper level of said bed of silica gel and recovering an effluent containing the polymerization reaction products from the top of said reactor.

---

This invention relates to a continuous polymerization method and, more particularly, to a method for polymerizing olefins having from three to five carbon atoms in a fixed-bed type of reactor.

It is known to polymerize olefins, such as isobutylene, by passing an olefin feed solution containing same through a fixed-bed reactor in which the effective polymerization catalyst is a Friedel-Crafts type catalyst. Thus, U.S. No. 3,109,041 discloses the use of a fixed-bed reactor in a second stage polymerization reaction. This reactor is filled with a bed of carbon, silica or alumina on which is absorbed a catalyst, such as aluminum trichloride, boron trichloride, or titanium tetrachloride. The partially polymerized feed stream from the first stage reaction together with the catalyst carryover is passed into the reactor filled with the supported catalyst to complete the polymerization of the olefin-containing feed stream. In this process, a substantial degree of the polymerization, i.e. from 40 to 95 percent, is effected in the first stage reactor before the feed stream is directed into the fixed-bed reactor to complete the reaction.

Packed bed type reactors are not known to have achieved any significant degree of commercial success. A principal difficulty with this kind of process appears to be that the catalyst bed is rather quickly coated with the polymer reaction products or otherwise inactivated thereby destroying the effectiveness of the process. Other disadvantages are the unsatisfactory level of catalyst utilization and the frequent downtime losses while fresh catalyst is prepared and loaded into the reactor.

A method has now been discovered whereby an olefin feed stream containing olefins having from three to five carbon atoms is continuously polymerized in a one-step process using a fixed-bed type reactor. Surprisingly, the process is effective to give a high yield of polymer and high catalyst utilization and to maintain this effectiveness for exceptionally long on-stream periods.

In accordance with this method, an olefin feed stream containing an olefin having from three to five carbon atoms under liquefying pressure is passed upwardly through a vertical elongated fixed-bed type reactor partially loaded with silica gel in the lower portion thereof while introducing an aluminum bromide-hydrogen bromide catalyst solution into said reactor at a point adjacent to the top of said bed of silica gel and recovering an effluent stream containing the polymerization reaction products from the top of said reactor.

The feed stream for this process comprises an olefin monomer or mixture of olefin monomers having from three to five carbon atoms in admixture with an inert diluent or solvent. Particular olefins which can be employed include propylene, isobutylene, 1-butene, 2-butene, pentene-1, pentene-2 and the like. The solvent is generally a hydrocarbon or mixture of hydrocarbons, such as a saturated aliphatic hydrocarbon having from three to eight carbon atoms, that is inert under polymerization conditions. The nature of the diluent is not critical so long as it is inert and effective as a solvent for the olefin feed and the polymer reaction product. In general, the olefin feed stream will contain from about 10 to about 80 percent by weight of the olefin monomer with the preferred concentration being from about 20 to 50 percent olefin. Both purified and refinery feed streams can be employed in the process. A suitable feed stream is a butane-butene stream containing about 30 percent isobutylene together with 1-butene and 2-butene and the balance about 50 percent of $C_3$–$C_5$ saturated aliphatic hydrocarbons. Another suitable feed stream is one containing approximately equal amounts of propylene and propane.

The reactor employed in this process is a fixed-bed type reactor in which the reaction vessel is an elongated vertical vessel or tower. The height of the reaction vessel can be from twenty to one hundred times the diameter of the vessel and preferably from thirty to sixty times the diameter of the vessel. This vessel is partially loaded with the calcined silica gel in order to form a bed of silica gel in the lowermost portion of the reactor. In a preferred embodiment of the invention the lower half of the reactor is filled with silica gel. While the actual height or amount of the silica gel in the reactor is not critical and may only fill the lower one-third of the reactor, it is essential that a substantial part of the reactor, i.e., at least the upper one-fourth to one-half of the reactor be free of silica gel. The upper portion of the reactor may be left completely void but it has been found much more desirable to reduce the void spaces using an inert packing material. Suitable inert packing materials include Raschig rings, Berl saddles, hexahelics packing, Lessing rings, prismic packing and the like. The use of inert packing material in the upper portion of the reactor effects a more thorough mixing of the olefin feed solution and the catalyst solution and gives a more efficient and complete polymerization reaction.

The catalyst for this reaction is aluminum bromide promoted with a hydrogen bromide donor. The aluminum bromide is employed in solution in an inert solvent, such as a saturated aliphatic hydrocarbon having from three to eight carbon atoms. The hydrogen bromide can be employed separately with or without solvent but it has been found most convenient to employ a single solution of aluminum bromide and hydrogen bromide. It is also convenient to employ the same solvent for both the catalyst solution and for the olefin feed solution. Highly effective catalyst solutions consist of from about 0.5 to 10 weight percent of aluminum bromide and from about 0.05 to 1 weight percent hydrogen bromide in an inert diluent.

A critical feature of this process is the point at which the catalyst solution is fed or introduced into the reactor. It is essential that the catalyst solution be introduced into the reactor at a point adjacent to the top of the bed of silica gel but not directly into the bed of silica gel. Due to mixing within the reactor, some of the catalyst is absorbed on the silica gel and is effective there while the balance remains in solution to exert its catalytic effect. This distribution of the catalyst is believed to promote a more effective and regulated reaction. The feed inlet for the catalyst solution is adjacent to the top of the silica gel bed if it is at any point from the top of the silica gel bed to a point within about four diameters of the reaction vessel above the top of the silica gel bed.

The polymerization reaction in this process is conducted at a temperature ranging from about −30° to 50° F., the particular temperature employed being a function of the desired molecular weight. Since the polymerization reaction is exothermic, cooling of the reactor is generally required to maintain the desired polymerization reaction temperature in the reactor. This is done most conveniently by passing a coolant through a jacket surrounding the reactor.

It is an essential feature of this process to pass the olefin feed solution upwardly through the reactor and through the bed of silica gel into contact with the polymerization catalyst at about the top level of the silica gel bed. Following this procedure and employing the above described conditions results in the production of polymers having number average molecular weights in the range of 700 to 2500 while maximizing polymer yield based on both monomer feed and catalyst utilization. Deviating from the disclosed procedure, such as by filling the reactor with silica gel, concurrently feeding the olefin feed stream and catalyst solution upwardly through the partially loaded reactor, concurrently feeding the olefin feed solution and the catalyst solution downwardly through the reactor, or feeding the olefin feed solution upwardly into a reactor in which the silica gel occupies the upper portion of the reactor while introducing the catalyst solution as a side stream below the bed of silica gel, have all resulted in a sharp reduction in the effectiveness of this process.

The reactor employed in the examples of the invention was a stainless steel (316 stainless) tubular reactor having an inside diameter of 1.5 inches and a length of 80 inches. The reactor was mounted in a vertical position and connected with an olefin charge tank, a catalyst charge system and a stripper for removing unreacted gases. Aluminum bromide was dissolved in n-hexane and then hydrogen bromide co-catalyst added so that the solution consisted of 5 percent by weight of aluminum bromide and 1.5 percent by weight of hydrogen bromide. The reactor was packed with 1000 grams of 200 mesh calcined silica gel to fill the lower 40 inches of the reactor. Raschig rings were employed to pack the remaining upper half of the reactor. A cooling system was employed to supply coolant to the jacket of the reactor.

The following examples Runs 1 through 3 illustrate the practice of this invention employing the reactor described above. The monomer feed stream was passed into the bottom of the reactor to flow upwardly therethrough and the catalyst solution entered the reactor at the top of the bed of silica gel.

TABLE I

| | Run 1 | Run 2 | Run 3 [1] |
|---|---|---|---|
| Monomer | Propylene | Propylene | Isobutylene |
| Length of test period, hrs | 12 | 12 | 20 |
| Monomer concentration, wt. percent in charge [2] | 20 | 20 | 20 |
| Gms. monomer/hr./gm. AlBr₃ charged | 73.1 | 163 | ∞ |
| Monomer+diluent charge rate, gms./hr | 469.0 | 439.0 | 454 |
| Equivalent LHSV, v./hr./v. (based on silica gel) | 0.72 | 0.65 | 0.68 |
| Coolant inlet temp., °F | 0.5 | 0.0 | 7 |
| Maximum reactor temp., °F | ~25.0 | ~20.0 | 14 |
| Reactor pressure, p.s.i.g. | 150 | 150 | 150 |
| Mn of polymer | 1,116 | 1,042 | 1,141 |
| Yield of polymer, gms./100 gms. monomer | 97.4 | 92.8 | 78.3 |
| Yield, gms. polymer/gm. AlBr₃ | 71.2 | 155 | ∞ |

[1] In this run the silica gel had become saturated with AlBr₃ by running several hours at monomer/AlBr₃ ratios of 60. The catalyst flow was then shut off for the remainder of this test period.

[2] Propane used as diluent for propylene, butane used for isobutylene.

The following examples were run in the same reactor vessel described above but with a different flow arrangement as noted. In Runs 4 and 5, the reactor was completely filled with silica gel. The olefin feed was directed upwardly through the reactor and the catalyst solution was introduced at the midpoint of the reactor. In Run 6 the upper half of the reactor was filled with silica gel, the propylene feed was upwardly through the reactor and the catalyst was introduced at midpoint i.e. at the bottom of the silica gel bed. In Run 7, the lower half of the reactor was filled with silica gel, the catalyst solution was introduced at the top of the bed of silica gel and the propylene feed was introduced at the top of the reactor to flow downwardly therethrough. In Run 8, the silica gel occupied the upper half of the reactor and both the propylene feed and the catalyst solution were introduced at the bottom of the reactor to flow upwardly therethrough. In Run 9, the silica gel occupied the lower half of the reactor and the propylene feed and the catalyst solution were introduced into the top of the reactor to flow downwardly therethrough.

The following examples Runs 4 through 9 demonstrate the results obtained when polymerizing a propylene feed stream in a fixed bed reactor according to the above-described flow schemes.

TABLE II

| | Run 4 | Run 5 | Run 6 | Run 7 | Run 8 | Run 9 |
|---|---|---|---|---|---|---|
| Monomer | Propylene | Propylene | Propylene | Propylene | Propylene | Propylene |
| Length of test period, hrs | 4 | 12 | 20 | 55 | 8 | 2 |
| Monomer concentration, wt. percent in charge | 20 | 20 | 20 | 20 | 50 | 20 |
| Gms. monomer/hr./gm. AlBr₃ charged | 58.2 | 171 | 46.5 | 79.3 | 135.8 | 92.7 |
| Monomer+diluent charge rate, gms./hr | 460 | 460 | 450 | 450 | 450 | 450 |
| Equivalent LHSV, v./hr./v. (based on silica gel) | 0.34 | 0.34 | 0.68 | 0.68 | 0.68 | 0.68 |
| Coolant inlet temp., °F | 0 | 0 | −20 | 0 | 10 | 0 |
| Maximum reactor temp., °F | 74 | 59 | 0 | 30–60 | ≤10 | 2 |
| Reactor pressure, p.s.i.g | 150 | 150 | 150 | 150 | 150 | 150 |
| Mn of polymer | 828 | 913 | 1,289 | 785 | 713 | 872 |
| Yield of polymer, gms./100 gms. monomer | 92.6 | 62 | 86.2 | 45.4 | 31.8 | 24.2 |
| Yield, gms. polymer/gm. AlBr₃ | 53.9 | 105 | 38.8 | 44.0 | 42.8 | 22.3 |

None of the foregoing Runs 4 through 9 inclusive give a high yield of polymer basis both the monomer feed and the catalyst consumed. Runs 4 and 6 give an unacceptable low catalyst utilization. Run 5 gives a low yield of polymer basis the monomer employed. Runs 7 through 9 give very low yields basis both the monomer feed and the catalyst consumed. The foregoing runs contrast sharply with the surprising and outstanding yields realized in the process of the invention.

Obviously, many modifications and variations of the invention, as hereinafter set forth, may be made without departing from the spirit and scope thereof, and therefore, only such limitations should be imposed as are indicated in the appended claims.

We claim:

1. A continuous method for polymerizing an olefin having from 3 to 5 carbon atoms in a fixed-bed type reactor to produce a polymer having from about 700 to 2500 number average molecular weight which comprises providing an elongated vertical reactor partially loaded with a calcined silica gel to form a bed, said bed of silica gel occupying the lowermost portion of said reactor, passing a feed solution of said olefin and an inert diluent under liquefying pressure upwardly into said reactor, said feed solution consisting of from about 10 to 80 percent of said olefin, passing a catalyst solution into said reactor at a point adjacent to the top level of said bed of silica gel, said catalyst solution consisting of aluminum bromide and of hydrogen bromide, cooling said reactor to maintain a temperature therein in the range of from −30 to 50° F. and withdrawing an effluent from the top of said reactor containing said polymer reaction product.

2. A method according to claim 1 in which said olefin is propylene.

3. A method according to claim 1 in which said olefin is isobutylene.

4. A method according to claim 1 in which the lower half of said reactor is filled with calcined silica gel and the upper half is filled with inert packing material.

5. A method according to claim 1 in which said catalyst consists of from 0.5 to 10 percent of aluminum bromide and from 0.05 to 1.0 percent of hydrogen bromide.

6. A method according to claim 1 in which the inert diluent in said feed solution and in said catalyst solution is a saturated aliphatic hydrocarbon having from 3 to 6 carbon atoms.

7. A method according to claim 1 in which the height of said reactor is from 20 to 100 times the diameter of the reactor.

8. A method according to claim 1 in which the silica gel occupies the lowermost one-third to two-thirds of the space in said reactor.

9. A method according to claim 7 in which said catalyst solution is introduced into said reactor at a point from the top of the bed of silica gel to a point within four diameters of the reaction vessel above the top of the silica bed gel.

References Cited

UNITED STATES PATENTS

| | | | |
|---|---|---|---|
| 2,447,313 | 8/1948 | Carmody et al. | 260—683.15 |
| 3,109,041 | 10/1963 | Child et al. | 260—683.15 |

PAUL M. COUGHLAN, JR., Primary Examiner